Figures 1, 10, 11:
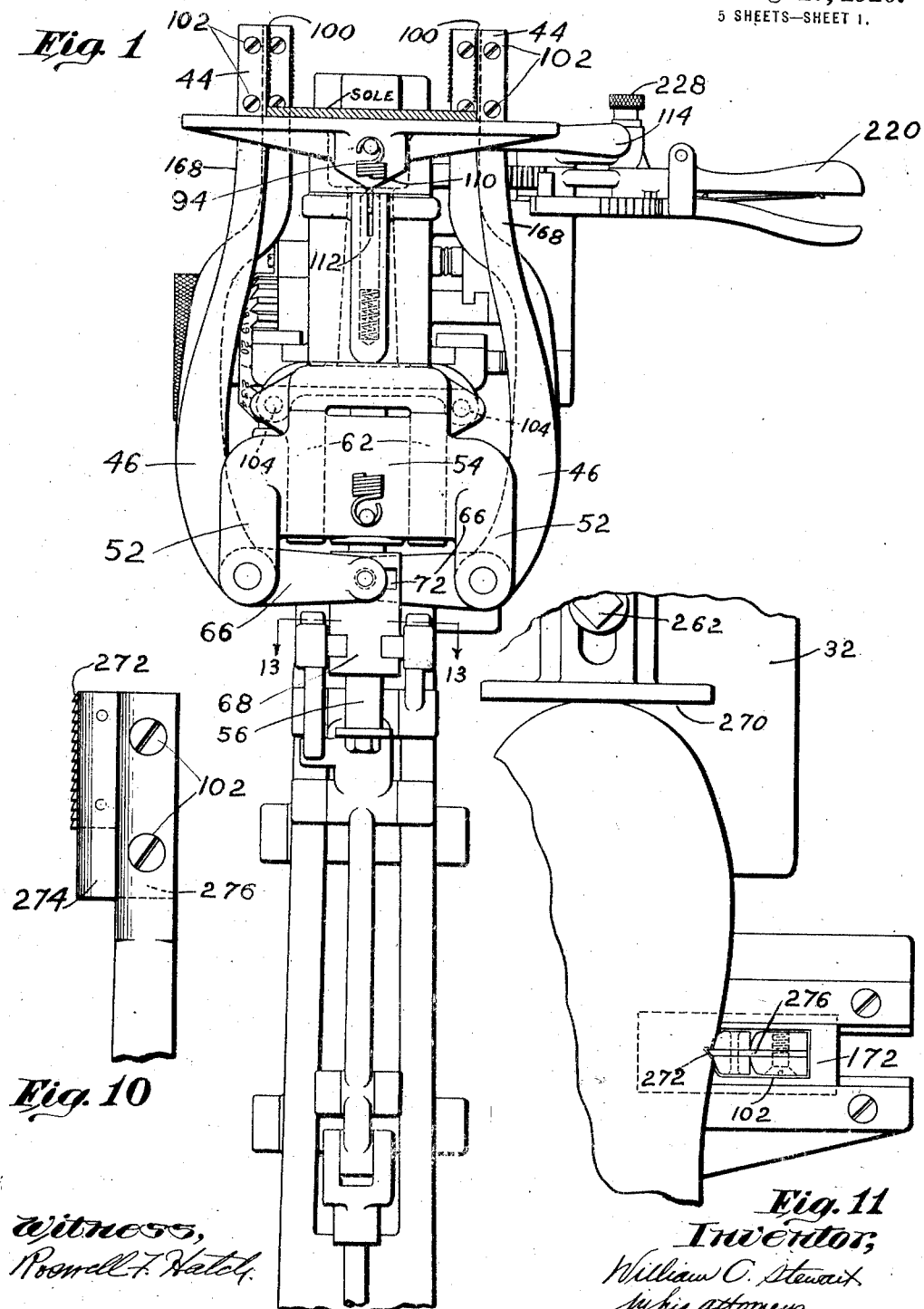

W. C. STEWART.
SOLE PREPARING MACHINE.
APPLICATION FILED JUNE 9, 1915.

1,349,740.

Patented Aug. 17, 1920.
5 SHEETS—SHEET 1.

Witness,
Roswell F. Hatch.

Inventor;
William C. Stewart
by his attorneys
Phillips, Van Everen & Fish

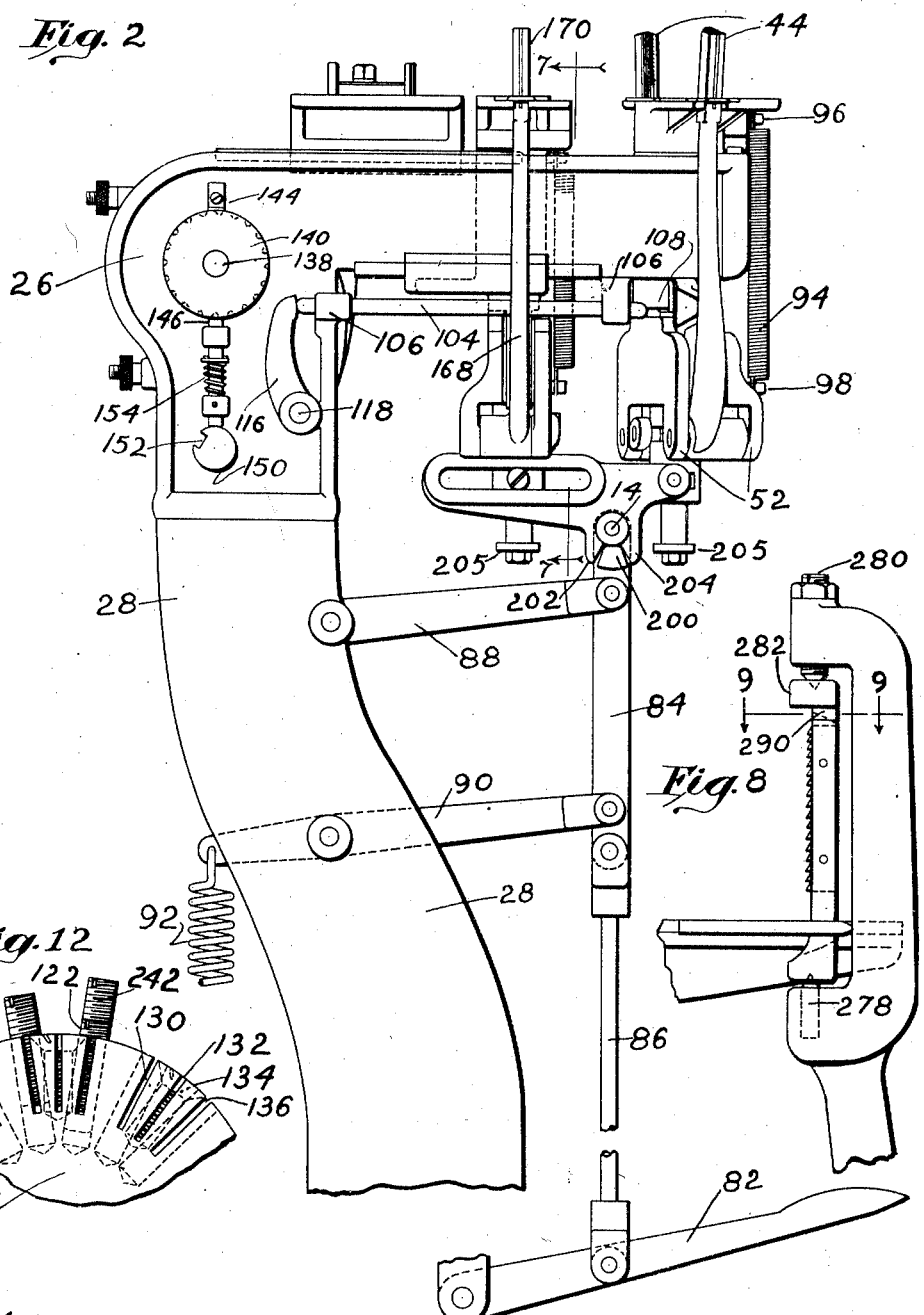

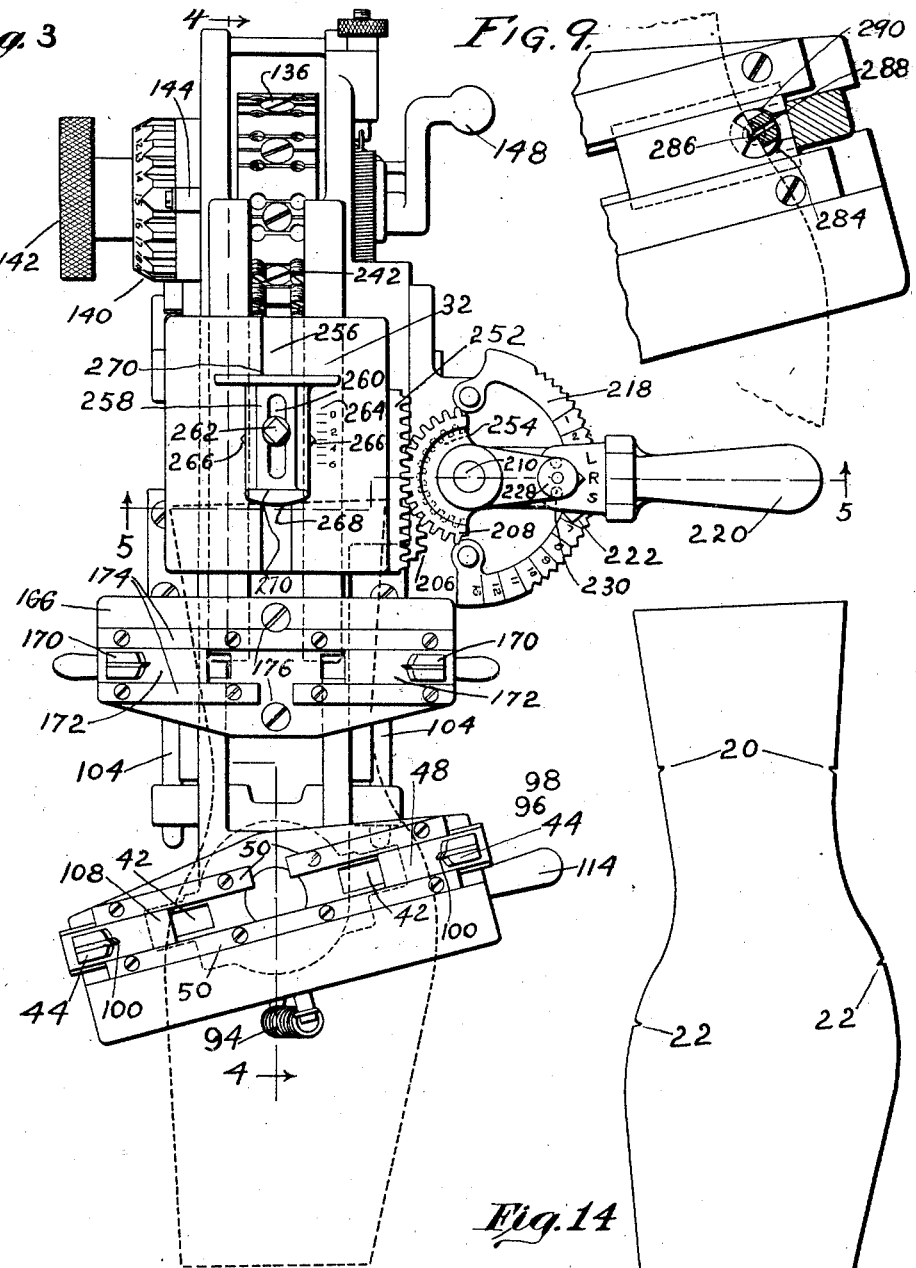

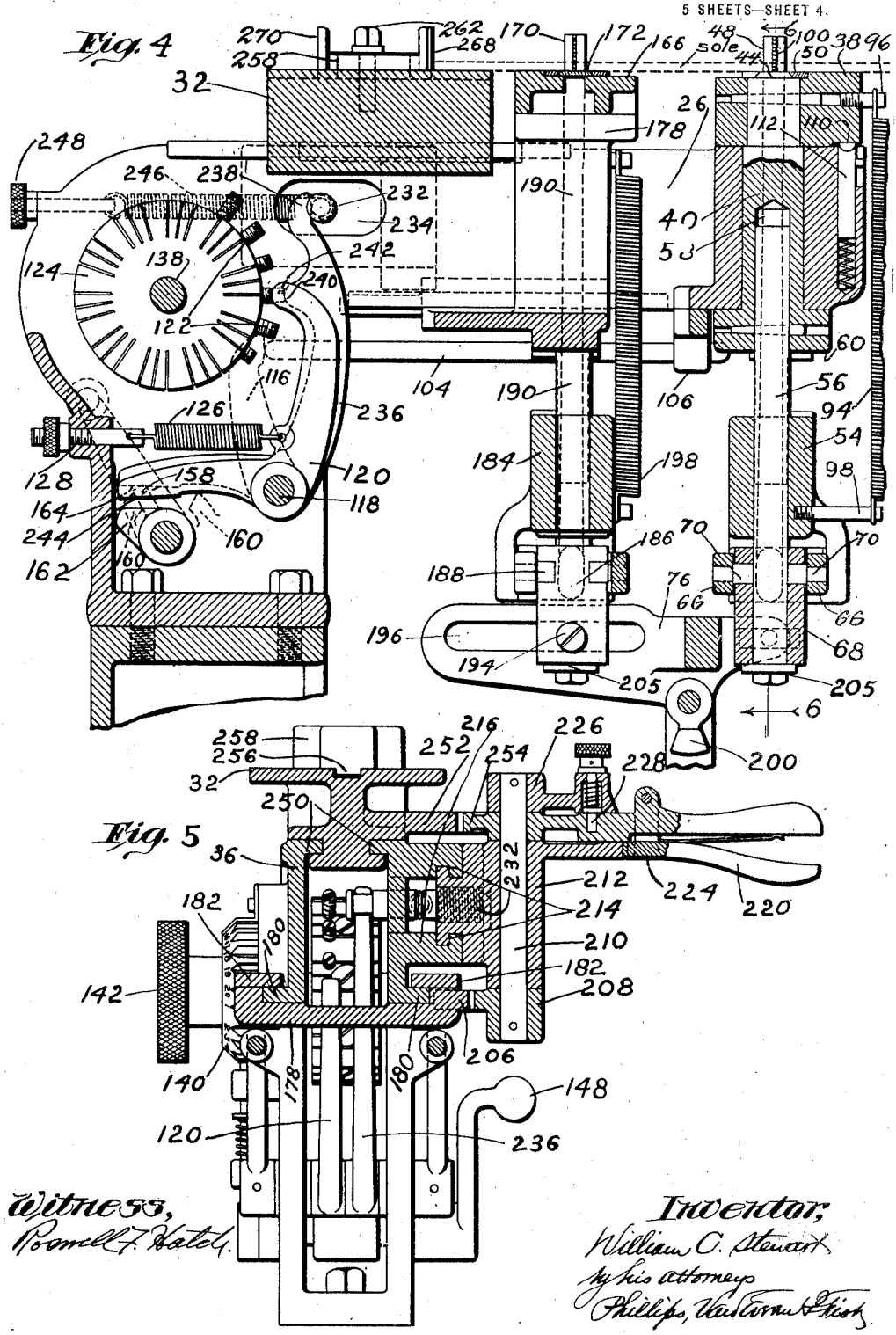

W. C. STEWART.
SOLE PREPARING MACHINE.
APPLICATION FILED JUNE 9, 1915.

1,349,740.

Patented Aug. 17, 1920.
5 SHEETS—SHEET 5.

Witness,
Roswell F. Hatch

Inventor;
William C. Stewart
by his attorneys
Phillips, Van Everen & Fish

UNITED STATES PATENT OFFICE.

WILLIAM C. STEWART, OF SWAMPSCOTT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SOLE-PREPARING MACHINE.

1,349,740.  Specification of Letters Patent.  Patented Aug. 17, 1920.

Application filed June 9, 1915. Serial No. 33,040.

*To all whom it may concern:*

Be it known that I, WILLIAM C. STEWART, a subject of the King of Great Britain, residing at Swampscott, in the county of Essex and State of Massachusetts, have invented certain new and useful Improvements in Sole-Preparing Machines; and I do hereby declare the following to be a full, clear, and exact description of the invention, such as will enable others skilled in the art to which it appertains to make and use the same.

This invention relates to sole preparing machines for use in the manufacture of outsoles for shoes.

In the manufacture of high grade shoes, and to improve the appearance of all grades of shoes, it has been the practice to reduce or skive the edge of the flesh side of the shank of the outsole. The reduction of the outsole at the shank not only gives a light edge which improves the appearance of the shoe but also facilitates the molding operation by which the shank is rounded into shape and caused to lie in close to the upper. The block and died out soles used for making outsoles have only approximately the shape of the finished sole and from these it is difficult to determine the proper location of the shank portion in which the skiving is made. This is especially difficult when using the same type of block and died outsole for making the many different styles of soles and providing for the variations of the shank location for the different sizes and widths for each style. However, it has previously been the practice for the shoemaker to depend entirely upon his skill and judgment to properly and uniformly locate the shank skiving. This same difficulty has also been experienced in properly locating the shank for molded soles where the workmen depended upon their eye for locating the various styles of soles in the molds.

The primary object of the present invention is to provide a machine for preparing outsoles by which a block or died out sole is provided with a series of marks or indices on its edge to serve as guides for subsequent operation upon the sole. In accordance with this object one feature of the invention contemplates the provision of a sole preparing machine having means for supporting and positioning a sole and a set of markers for placing indices in the edge of a sole.

A further object of the invention is to provide a sole preparing machine by which a set of indices are placed on a sole and these indices are located with reference to the true ball line of the sole regardless of its size and the size of finished sole to be made from it. In accordance with this object, a further feature of the invention contemplates the provision in a sole preparing machine of a fixed ball line marker and means for positioning and centering the sole so that its true ball line will substantially coincide with the marker when it is marked. In the preferred form of the invention the sole is positioned by means of a heel gage which is adjusted for different styles and sizes of heels with reference to a fixed ball line marker. These adjustments, however, are for regular and properly sized block and died out soles. In case it is desired to make, for instance, a 6 size outsole out of a 10 size block sole, the heel gage has a further adjustment so that the sole will be positioned to have the ball line of the 6 size sole approximately coincide with the true ball line of the 10 size block sole. With this system of adjustment the shank will be properly located, and when the sole is attached to the shoe it will be trimmed off at the heel as well as the toe by the rough rounding machines.

Another object of the invention is to provide a sole marking machine in which the sole markers act to position the sole when they are actuated to mark the sole. In accordance with this object another feature of the invention contemplates the provision in a sole preparing machine of a support for a sole and a plurality of markers for positioning the sole on the support and then marking it.

The present invention also consists in certain devices, combinations and arrangements of parts hereinafter described and claimed, the advantages of which will be obvious to those skilled in the art, from the following description.

Figure 6:
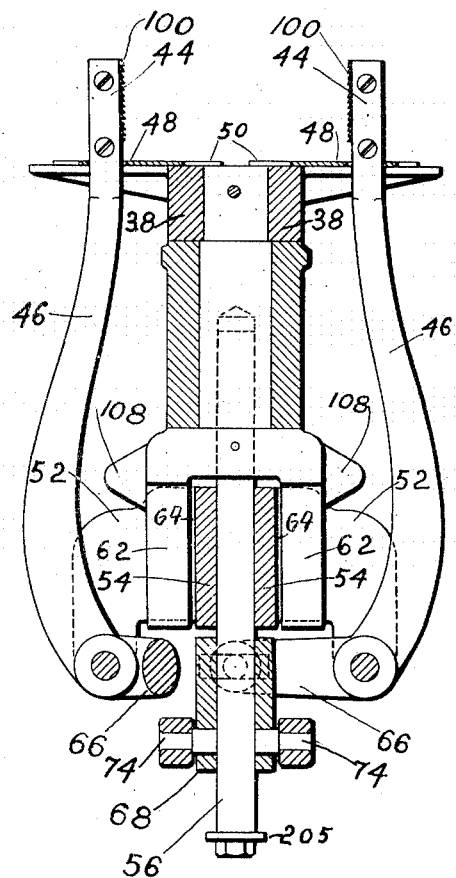
Figure 7:
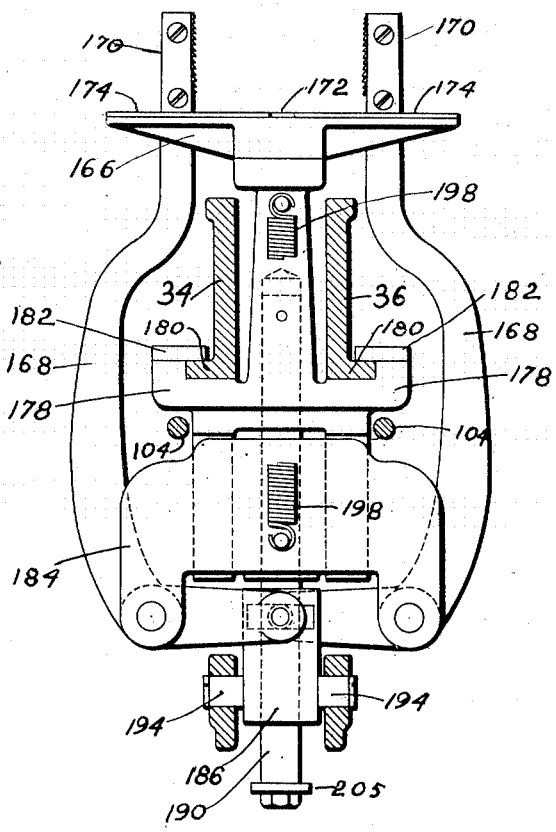
Figure 13:
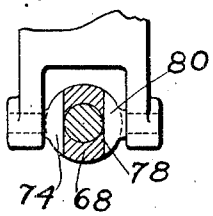

The preferred form of the invention is illustrated in the accompanying drawings in which Figure 1 is a front elevation of a sole preparing machine; Fig. 2 is a side elevation of the machine; Fig. 3 is a plan view of the machine; Fig. 4 is a vertical section of the machine taken on the line 4—4 of Fig. 3; Fig. 5 is a vertical section of the machine taken on the line 5—5 of Fig. 3; Fig. 6 is a vertical section of the ball line marker taken on the line 6—6 of Fig. 4; Fig. 7 is a vertical section taken on the line 7—7 of Fig. 2, showing an elevation of the breast line marker; Fig. 8 is a detail view showing a swiveled marker; Fig. 9 is a plan view of the swiveled marker taken on the line 9—9 of Fig. 8; Fig 10 is a detail view of a modified form of sole marker; Fig. 11 is a partial plan view showing the arrangement of the heel gage and breast line marker when operating on died out soles; Fig. 12 is a detail view showing the construction of the style wheel; Fig. 13 is a horizontal sectional detail taken on the line 13—13 of Fig. 1, showing the connection between the operating slide and equalizing lever; and Fig. 14 is a view of a block sole as marked by the machine.

The machine illustrated in the drawings is used for placing a series of marks or indices in the edges of a block or died out sole which serve to act as guides for the boundaries of the shank or act as positioning points in using a shank skiving machine provided with a stop. When employing the machine for operating on block soles such as illustrated in Fig. 14, the sole rests upon the upper faces of carriers for the sole markers and the heel gage. The sole is positioned by means of a heel gage which is adjusted with reference to the axis of the ball-line and all adjustments of the carriers are made with reference to the ball-line axis. After placing the sole against the heel gage the markers are actuated to first center the sole and then place notches 20 on both sides of the sole to indicate the boundaries of the heel breast line and notches 22, on the opposite sides of the sole to indicate the boundaries of the ball-line.

The ball-line marker carrier is pivoted on a vertical axis in the front end of the machine frame head 26 which rests on a frame base 28. The ball-line marker carrier has a fixed vertical axis and is adjusted angularly on this axis for the various styles of shoes to change the angle of the ball line. The breast line marker carrier and the heel gage carrier 32, are slidably mounted upon guides 34 and 36 formed integral with the machine head 26. The breast line marker carrier and the heel gage carrier are adjustable longitudinally of the guides with reference to the fixed axis of the ball line marker carrier. The breast line marker carrier has adjustments for different styles of soles, different sizes of soles, and different styles of heels, and the heel gage carrier has adjustments for different styles of soles and different sizes of soles.

The ball line marker carrier has a table 38 (Figs. 4 and 6) which is pinned to the upper end of a hollow spindle 40, pivotally mounted in the machine head. This table is provided with a pair of slots 42, in which are mounted the ball line marker consisting of arms 44 of the bell cranks 46 which carry marking blades 100. The upper ends of the marker arms 44 project through openings in a pair of table slides 48, which move back and forth in the slots 42 with the arms. The guides for holding the table slides in position consist of a set of gib plates 50, which are set in the face of the table, the whole structure being such that the face of the table 38, the table slides 48 and the gib plates form a plain surface as a rest or support for the sole while it is being marked. The marker bell cranks 46 are pivotally mounted in yokes 52 formed on each side of a marker carrier 54 which is slidably mounted upon a rod 56 (Figs. 1 and 4) keyed in a socket 58 of the spindle 40. The lower end of the spindle 40 has a base 60 which abuts against the lower face of the machine head 26, so that the table 38 which is pinned to the spindle, is securely held in position. Formed integral with the spindle base 60 is a pair of arms 62 (Fig. 6) which project down through guideways 64 formed in the body of the marker carrier 54. This construction unites the table, marker arms and marker carrier so that any rotation of the table will simultaneously be imparted to the marker arms and marker carrier. The lower arms 66 of the bell cranks 46 are pivotally connected to an adjusting slide 68 on the rod 56 by means of a pair of rollers 70 attached to the levers 66 and projecting into arcuate slots 72 formed in the slide 68. As shown in Figs. 4 and 6, the arm 66 of the marker bell crank on the right extends to the rear face of the adjusting slide 68, and the arm 66 of the bell crank lever on the left projects to the front side of the slide. The slots 72 permit oscillation of the marker arms around the slide 68 when rotating the table 38 to vary the angularity of the ball line. The adjusting slide is locked from rotation about the rod 56 by means of a pair of pins 74, which act as pivot pins in connecting the slide with an equalizing lever 76. As illustrated in Fig. 13, the adjusting slide has a pair of slots having a flat face 78, and the pins 74 have a corresponding flat face 80 which rests against the face 78. By this means the slide is held from rotation while having a horizontal pivotal connection with the equalizing lever to permit a vertical movement of the slide on the rod 56. The equalizing lever is actuated to move the slide by means of a foot treadle 82 which is connected to the equalizing lever by means of the links 84 and 86. The link 84 is always held in a vertical position by means of parallel guide levers 88 and 90 which are pivotally connected between the link 84 and the machine base 28. A coiled spring 92 connected between the end of the lever 90 and the base 28 normally tends to hold the equalizing lever and the foot treadle in elevated position. The marker carrier is normally held in elevated position by means of a strong coil spring 94 connected between a pin 96 projecting from the front of the table 38, and a pin 98 mounted in the face of the carrier 54. When the carrier is in elevated position, the ball line marker are separated and located in substantially the position shown in Fig. 3, so that the sole may be laid upon the face of the table between them. With this construction, when a sole is resting upon the carrier, a downward pressure upon the treadle 82 will pull down the adjusting slide 68 and rotate the bell cranks 46 about their axes until the markers come in contact with the edge of the sole and center it upon the table. The strength of the spring 94 holds the carrier 54 in elevated position during this operation, and it is only when the markers 44 have come in contact with and centered the sole that the carrier 54 will be drawn down along the rod 56 and against the tension of the spring 94 by a further movement of the treadle.

The ball line markers are cut away at their upper ends to form a recess in which the toothed marker or cutting blade 100 is clamped by means of screws 102. (Figs. 1 and 3). When the markers are held in their elevated position the bottom of the cutting edge of the blades 100 are far enough above the top of the table to not touch the thickest stock to be operated upon. In the movement of the marker arms to center the sole, the sides of the arms contact the opposite edges of the sole and during the marking operation the sides of the arms remain in contact with the edge of the sole while the marking blades are moved vertically downward to make the notches 22 shown in Fig. 14. The openings in the table slides 48 have substantially the same contour as the marker arms with the cutting blades in them and are only large enough to permit the arms to slide freely through them. In the marking operation the table slides, by fitting so close to the marker arms, give a firm support for the sole so that the blades 100 make a clean cut in it.

The angular adjustment of the ball line marker carrier for different styles of shoes, is determined by means of a pair of abutment rods 104 (Figs. 1, 2, 3 and 4) which are mounted in lugs 106 formed on opposite sides of the machine head 26. These abutment rods are adapted to contact with ears 108 formed on opposite sides of the spindle base 60 to hold it in different angular positions. The lower side of the table 38 is provided with a pair of cam surfaces 110 which are acted upon by a spring pressed plunger 112 to keep an ear 108 of the carrier pressed against one of the abutment rods 104.

The plunger 112 (Figs. 1 and 4) is mounted in a recess in the machine head immediately below the table 38 and the head of the plunger has a pair of inclined faces which act on the cam face 110 in holding the table in adjusted position. The ball line marker carrier has a handle 114 by which it may be oscillated about its axis to set it against the abutment rods 104 on the right or left side of the machine head for marking left or right soles, respectively. The cam surfaces 110 on the lower side of the table will be acted upon by the plunger 112 to maintain the adjustment of the table, regardless of which type of sole is being marked. The position of the abutment rods 104 is controlled by means of a pair of arms 116, which are keyed to a rock shaft 118 mounted in the guides 34 and 36 of the machine head, (Figs. 2, 4 and 5). A bell crank lever 120 is keyed to the shaft 118 between the guides to move with the arms 116, and has an upper arm which is held in contact with pins 122 of a shoe style wheel 124, by means of a spring 126 connected between the lever and an adjusting bolt 128 mounted in the machine head.

The style wheel which governs the different settings of the carriers for different styles of shoes (Figs. 4 and 12) consists of a cylinder provided with a set of radial screw threaded openings 130 in which the style pins 122 may be adjusted, and a second set of screw threaded openings 132 for the reception of wedge screws 134. The style pin openings are equally spaced around the periphery of the cylinder and the wedge screw openings are arranged between every other pair of style pin openings. All of the threaded openings are intersected by radial slots which are formed in group of threes with the center slot 136 of the group intersecting the wedge screw openings. The segments between the wedge screw slots and the style pin slots are yielding so that when the style pins have been adjusted in the openings 130, the wedge screws can be set in openings 132 between a pair of style pins to securely lock them in position. The style wheel is mounted on a shaft 138 which is journaled between the guides 34 and 36, and one end of the shaft extends beyond the side of the guide 36. On the extended end of the shaft is mounted a dial 140 having a hand wheel 142. The periphery of the dial is provided with a series of notches each of which has a numeral to designate a particular style of shoe. A dial reference pointer 144 is attached to the guide 36 above the dial, with the pointer extending over the numeral scale. Diametrically opposite the pointer 144 is placed a spring pressed pawl 146 which is mounted in guides at the side of the guide 36. This pawl has a toothed face which fits into the style notches of the style wheel to lock the style wheel in adjusted position.

In order to set the style wheel to change the style of sole to be marked, it must be unlocked from the pawl 146, and the bell crank lever 120 must be removed from the style pins 122 to permit it to rotate. This is accomplished by means of a releasing lever 148 which has a shaft pivotally mounted between the guides 34 and 36 immediately below the style wheel. The end of the shaft of the lever 148 is provided with a cam 150 (Fig. 2) which operates upon the end of the locking pawl 146. This cam has a notch 152 which, when placed below the end of the pawl 146, will allow a spring 154 connected with the pawl to withdraw the locking face of the pawl from the notch in the style dial. The hand lever 148 is provided with a lug 158 (Fig. 4) which operates between a pair of stop lugs 160 located on the outer face of the guide 34. When the lug 158 is against the stop to the right in Fig. 4, the notch 152 is below the end of the pawl, and the style wheel will then be unlocked, and when the lug 158 is against the stop to the left in Fig. 4, the pawl is held in a position to lock the dial from rotation. Upon the shaft of the hand lever 148, between the guides 34 and 36, is keyed a cam 162 which acts upon a cam face 164 formed on the lower arm of the bell crank lever 120, so that when the hand lever is rotated to bring the notch 152 in position to unlock the pawl from the style dial the cam 162 will act upon the face of the bell crank lever and rotate it to a position out of contact with the style pins 122. With this construction, after the style wheel has been moved to any position indicated by the dial, the dial will be locked in this position when the bell crank 120 is brought into contact with the style pins to give the proper angular direction to the ball line marker carrier.

The breast line marker carrier consists of a table 166 having a construction quite similar to the table 38. The bell cranks 168, with breast line markers 170 extending through slots in the table, and slide plates 172 for the marker arms movably mounted between the gib plates 174, are substantially the same as the corresponding parts of the ball line marker carrier. The breast line marker carrier table, however, is rigidly mounted by screws 176 on the top of a carrier slide 178 which is slidably mounted upon outwardly projecting flanges 180 (Figs. 5 and 7) formed integral at the bottom of the guides 34 and 36. The bottom of the slide 178 has arms extending across and embracing the flanges 180, and a pair of guide plates 182 are fastened to the arms of the slide so as to rest upon the top of flanges 180 to securely lock the slide on the guides 34 and 36. The marker carrier 184, in which the bell cranks 168 are pivoted, and the actuating slide 186 are substantially the same as the corresponding parts of the ball line carrier. However, since the marker carrier does not rotate, the lower arms of the bell crank 168 are pivotally connected to the actuating slide 186 by means of headed stud pins 188 which fit into flat sided sockets in the slide 186 forming a pivotal connection similar to the connection between the slide 68 and equalizing lever 76 to hold the slide 186 from rotation. A rod 190 carrying the marker carrier 184 and adjusting slide 186, is substantially the same as the rod 56, and has one end keyed in a socket 192 formed in the slide 178. The adjusting slide 186 of the breast line marker carrier is pivotally connected to the equalizing lever by means of rollers 194 engaging a pair of slots 196 in the equalizing lever 76. The marker carrier and adjusting slide are normally held in elevated position, with the marker arms separated as shown in Fig. 3, by means of a coiled spring 198 connected between a pin in the marker carrier and a pin in the carrier slide 178.

The sole is supported and centered upon the breast line carrier, and the marker blades are mounted in the markers and operate to place notches in the sole at the breast line in the same manner as hereinbefore set forth in describing the ball line carrier. The markers of both the ball line and breast line marker carriers are operated by the foot treadle 82, and the order of their operation is controlled by the equalizing lever 76. The link 84 connecting the equalizing lever with the foot treadle is provided on one side with a projection 200 which fits between stops 202 and 204 formed below the pivotal axis of the equalizing lever. With this construction, when the foot treadle 82 is brought down to operate on the sole, the ball line marker carrier is moved down until the stop 204 contacts with the projection 200, and then the equalizing lever begins to act on the breast line marker carrier. The marker carriers are held up by springs 94 and 198 until the marker arms center the sole, and then the further movement of the treadle tends to move the carriers down against the action of the springs 94 and 198 to mark the edge of the sole. The carrier rods 56 and 190 have stop plates 205 screwed into their lower ends which limit the downward movement of the treadle when cutting the notches in the edge of the sole.

The carrier slide 178 has adjustments longitudinally of the guides 34 and 36 for different sizes of soles. This adjustment is obtained by means of a rack 206 (Figs. 3 and 5) which is secured to the lower flange of the slide and meshes with a pinion 208 that is secured on a rock shaft 210 journaled in a scale slide 212. The scale slide is slidably mounted at the side of the guide 34 in guideways 214 formed in arms 216 integral with the guide 34. On the upper face of the scale slide 212 is formed a segmental size dial 218, the outer periphery of which is provided with a series of notches, each notch being used for a setting for a different size of sole. The face of the dial has a set of numerals to designate the different sizes, and for each numeral the dial has two notches, one representing the size, and the other the half size. A hand adjusting lever 220 is loosely mounted on the shaft 210 to swing over the dial, and has a pointer 222 to indicate a setting for the different sizes. The hand lever is provided with a spring pressed pawl 224 which has a toothed face to enter the notches on the periphery of the dial and lock the hand lever in an adjusted position. The hand lever is locked to the shaft 210 for rotation therewith by means of an auxiliary arm 226 which is pinned to the upper end of the shaft 210 and has a spring pressed plunger 228 in its outer end adapted to fit into openings 230 in the upper face of the hand lever. When the plunger 228 is in register with an opening 230 to lock the hand lever to the shaft 210, an adjustment of the hand lever around the dial 214 will tend to reciprocate the breast line marker carrier slide 178 along the guides 34 and 36 to vary the setting of the breast line marker.

The breast line marker carrier is also connected with the style wheel, so that the setting for different sizes of soles may be varied for the different styles of soles. The variation for different styles of soles is secured by means of a connection of the scale slide 212 with the style wheel 124. A pin 232 is threaded into the back side of the scale slide, in a position to project through an opening 234 (Figs. 4 and 5) in the guide 34, and a bell crank lever 236 pivoted on the shaft 118 has a hook 238 on its upper end which engages the pin. The upper arm of the bell crank 236 also has a projection 240 which is adapted to contact with a set of style pins 242 on the style wheel 124. The lower arm of the bell crank 236 has a cam face 244 which is similar to the cam face 164 on the style adjustment bell crank 120 of the ball line marker carrier. The scale slide 212 is normally held against the bell crank 236 to hold the projection 240 in contact with the style pins by means of a coiled spring 246 which is connected between the pin 232 and an adjusting bolt 248 mounted in the machine head. The spring 246 tends to hold the scale slide securely in adjusted position, so that any movement of the hand lever 220 is imparted through the rack and pinion to the breast line slide, and does not move the scale slide. In adjusting the breast line marker carrier for different styles of shoes, any change of the bell crank 236 by means of the style pins 242 tends to carry the scale slide 212 and the breast line marker carrier slide 178 bodily along the guides 34 and 36, so that the setting for different sizes of shoes by means of the hand lever 220 does not need to be altered for the different styles.

The breast line marker carrier has a further adjustment for different styles of heels which is made by locking the arm 226 in different positions in the face of the hand lever 220 by means of the plunger 228 and openings 230. When moving the arm 226 over the series of openings in the hand lever 220 the shaft 210 is moved to vary the setting of the breast line slide 178 while the hand lever 220 remains stationary.

The heel gage carrier consists of the table slide 32 which is mounted between a pair of inwardly projecting flanges 250 (Fig. 5) formed on the upper edge of the guides 34 and 36. The heel gage carrier has adjustments for the different sizes and styles of soles. This is secured by means of a rack 252, mounted on the side of the carrier above the guide 34, which meshes with a segment pinion 254 formed on the end of the hand lever 220, the pitch of the rack 252 and pinion 254 being proportioned so that when the hand lever 220 is moved to adjust the breast line marker carrier, the heel gage will be relatively adjusted thereby, and when the size slide 212 is adjusted by means of the style wheel for the various styles of soles, the heel gage carrier is bodily pulled along with the size slide.

The upper face of the heel gage carrier is provided with a guideway 256 (Figs. 3, 4 and 5) in which is slidably mounted a heel gage 258. The heel gage is provided with a slot 260 by which it may be adjusted along a pin 262 used in securing the heel gage to the carrier 32. In the process of making shoes, especially when using block soles, all of the various sizes of soles are made from a few sizes of block soles. For this reason, when positioning the block sole from its heel end, it is necessary to vary the setting of the heel gage in order that the ball line may be accurately located. For example, in marking a six size sole from a block sole sufficiently large to make a ten size sole, the heel gage should be set back farther in order to have the axis of the ball line register with the true axis of the ball line of the block sole. The upper face of the carrier 32 is provided with a scale 264, and the heel gage has a pair of pointers 266 which work over the scale for determining the setting of the gage. This scale 264 is employed for setting the gage for over-size soles, and the numerals of the scale correspond to index numbers of the measuring machine shown and described in my copending application Serial No. 33,542 filed June 11, 1915. The heel gage 258 is reversible and has a single point guiding face 268 used in marking block soles, as illustrated in Fig. 3, and a straight face guide 270 which is used in marking died-out soles, as illustrated in Fig. 9. By having a pointer 266 on each side of the gage 258 it may be located on the scale 264 regardless of the type of sole being marked.

When working on all the various styles of shoes, and especially upon infants' shoes and women's shoes, of the smaller sizes, it is necessary to put an extension marking blade on the ball and breast line markers 44 and 170 respectively in order to decrease the necessary movement of the marker carriers 54 and 184 in centering the sole. This extension marking blade is clearly shown in Figs. 10 and 11 in which a blade 272 is provided with an abutment 274, and has a shank 276 which extends into the recess of the marker arm to be secured in place by the usual screws 102.

In marking soles which have a sharp angle at the ball line, the angle may be of such direction as to bring the edge of the sole against the side of the marker, and prevent the cutting edge of the blade from marking the sole. When operating upon soles of this character, it has been found desirable to employ a swiveled marking tool, which is illustrated in Figs. 8 and 9. In this case, the upper end of the bell crank 46 has a yoke, in the lower end of which is mounted a fixed pivot 278 and in the upper arm an adjustable pivot 280. A ball line marker 282 is rotatably mounted between the pivots 278 and 280 and carries a marking blade similar to the blade 100.

When drawing the toothed marking blade across the edge of a sole to place notches in its edge, it has been found necessary to provide a table slide to give a bearing for the sole which is being marked. The table slides 48 and 172 of the ball and breast line marker carriers shown in Figs. 3 and 9 have openings of the shape of the contour of the marking arm with a blade fastened in it, which are large enough to permit the marking arms to slide freely through them. A table slide 284 for a swiveled marker 282 is illustrated in Figs. 8 and 9, which has an opening shaped to permit the marker to rotate in adjusting itself to the edge of the sole and still to provide a bearing for the sole while it is being marked. To assemble the table slide 284 and the marker 282, the table is provided with a key-way 288, and the marker with a reduced portion 290, so that the part 290 can be passed through the key-way 288, and then the table plate moved along the axis of the marker to bring it in a position to rest on the carrier table 38. With this construction, when the marker arm 44 is moved in to center the sole, the flat face 292 of the ball line marker will be automatically adjusted against the edge of the sole, so that the blade will be in a position to place a notch in the edge of the sole when drawn along the sole edge.

The mode of operation of the machine has been developed in the detailed description of the parts and their relation to one another.

In certain of the claims the terms "ball line marker", "breast line marker", and "sole marker" are used, which are to be understood as devices for placing a mark or a plurality of marks upon a sole that will visibly indicate the position of the ball line, breast line, and other positions, such as the tip line, heel or toe center, or the end of the shank piece.

Having thus indicated the nature and scope of my invention and having specifically described a machine embodying a preferred form thereof, I claim as new and desire to secure by Letters Patent:

1. A sole preparing machine, having, in combination, a ball line marker carrier, a breast line marker carrier, a heel gage carrier having a heel gage thereon, sole markers mounted in the marker carriers, means for adjusting the carriers to adapt them for a predetermined type of sole, and means to actuate the markers.

2. A sole preparing machine, having, in combination, a ball line marker, a breast line marker, carriers for said markers which are constructed to support the sole, and means for actuating the markers.

3. A sole preparing machine, having, in combination, a support for the sole, a set of sole markers, and means to actuate said markers to form notches extending completely across the edge of the sole.

4. A sole preparing machine, having, in combination, a support for the sole, a plurality of markers for positioning and marking the sole, and means for actuating the markers.

5. A sole preparing machine having, in combination, a marker carrier for supporting the sole, a plurality of markers mounted in the carrier, and means to actuate the markers to first position the sole and then mark it.

6. A sole preparing machine having, in combination, a plurality of carriers for supporting the sole, markers for positioning and marking the sole mounted in one of said carriers, and means for relatively adjusting the carriers to position different types of soles.

7. A sole preparing machine having, in combination, a support for the sole, a ball line marker, a breast line marker, and means to actuate the markers to form notches extending completely across the edge of the sole to indicate the location of the ball and breast lines respectively.

8. A sole preparing machine having, in combination, a support for the sole, a plurality of markers mounted in the support which are normally separated a distance greater than the width of the sole, and means to actuate the markers to mark the edge of the sole and to return them to normal position.

9. A sole preparing machine having, in combination, a ball line marker, a breast line marker, a heel gage, and means for adjusting the breast line marker and the heel gage with reference to the ball line marker to properly position the sole.

10. A sole preparing machine having, in combination, a sole marker, a support for the sole, a heel gage for positioning the sole, means for adjusting the gage for different styles of heels, and additional means for varying the adjustment of the gage for different sizes of soles.

11. A sole preparing machine having, in combination, a ball line marker, a breast line marker, a heel gage, means for adjusting the markers for different styles of soles, and means by which the heel gage may be set to position a sole blank so that the ball line of the sole blank will register with the ball line marker.

12. A sole preparing machine, having, in combination a heel gage carrier, a heel gage on the carrier for longitudinally positioning a sole, a plurality of marking carriers for supporting the sole, markers pivotally mounted at opposite sides of the marker carriers, means for connecting the markers to move in unison, means to actuate the markers to center the sole, and a blade in the markers for marking the sole.

13. A sole preparing machine having, in combination, marker carriers provided with sole markers, a heel gage carrier provided with a heel gage, means to adjust the carriers to position them in providing for different styles and sizes of soles and styles of heels, means to set the heel gage so that the carrier adjustments will properly position over size soles to be marked and means to actuate the carriers.

14. A sole preparing machine having, in combination, a marker, a gage, means to support a sole, and means to actuate the marker to center the sole and mark it.

15. A sole preparing machine having, in combination, a support for a sole, a plurality of markers projecting above the top of the support, and means to actuate the markers to form notches extending completely across the opposite edges of a sole.

16. A sole preparing machine having, in combination, a plurality of marker carriers for supporting a sole, markers on said carriers normally separated so as to be on opposite sides of a sole supported on the carrier, and means to actuate the markers to contact and mark opposite edges of the sole.

17. A sole preparing machine having, in combination, a ball line marker carrier, a breast line marker carrier, a heel gage carrier having a heel gage for positioning the sole, markers in the ball and breast line marker carriers normally separated to allow the sole to be placed between them, and means to actuate the markers to center the sole and mark it.

18. A sole preparing machine having, in combination, a ball line marker carrier, adjustable about a fixed axis for different styles of soles, a breast line marker carrrier, markers in said carriers for marking the edge of a sole, a heel gage carrier having a heel gage, and means to adjust the breast line marker carrier and heel gage carrier for different styles and sizes of soles.

19. A sole preparing machine having, in combination, a plurality of marker carriers for supporting the sole, markers in said carriers, a heel gage carrier, and a reversible heel gage on said gage carrier for positioning different types of soles.

20. A sole preparing machine having, in combination, a ball line marker carrier, a breast line marker carrier, a pair of markers pivotally mounted in each, actuating mechanism for each pair of markers mounted on the carriers, an operating lever connected with said mechanism for moving each marker toward the center of the carrier to center the sole, and means for drawing the marker across the sole to mark it.

21. A sole preparing machine having, in combination, a marker carrier for supporting a sole, a heel gage carrier having a heel gage for positioning a sole, a pair of markers movably mounted in the marker carrier and a slide movable across the face of the marker carrier and connected with the marker.

22. A sole preparing machine having, in combination, a support for the sole, a gage for positioning the sole, a breast line marker for centering the sole, means to adjust the marker for different sizes and styles of soles, and means to adjust the gage for different styles of heels.

23. A sole preparing machine, having, in combination, a ball line carrier movable about a fixed axis, markers in said carrier, a breast line carrier having breast line markers, a heel gage carrier having a heel gage, means to adjust the gage and breast line markers with reference to the ball line marker for different sizes and styles of shoes, and means to vary the adjustment of the gage in providing for different styles of heels so that a sole blank may be positioned to have its true ball line in register with the ball line marker, and the finished sole will be located on the blank with reference to its true ball line.

24. A sole preparing machine having, in combination, a support for the sole, a ball line marker, a breast line marker, means for effecting a relative adjustment of said markers for soles of different sizes, and means to actuate said markers to form notches extending completely across the edge of the sole to indicate the location of the ball and breast lines.

25. A sole preparing machine, having, in combination, a support for the sole, a sole marker rotatably mounted to adjust itself to the contour of the sole edge, a marking blade carried by the sole marker, and means for actuating the marker to engage and mark the edge of the sole.

WILLIAM C. STEWART.